US008896765B1

(12) United States Patent
White et al.

(10) Patent No.: US 8,896,765 B1
(45) Date of Patent: Nov. 25, 2014

(54) SYSTEMS AND METHODS FOR REMOTE CONTROL OF A TELEVISION

(71) Applicant: Shadowbox Media, Inc, College Station, TX (US)

(72) Inventors: Jake Thomas White, Austin, TX (US); Oliver Stayton White, Austin, TX (US)

(73) Assignee: Shadowbox Media, Inc., College Station, TX (US)

( * ) Notice: Subject to any disclaimer, the term of this patent is extended or adjusted under 35 U.S.C. 154(b) by 0 days.

(21) Appl. No.: 14/279,456

(22) Filed: May 16, 2014

(51) Int. Cl.
*H04N 5/44* (2011.01)
(52) U.S. Cl.
CPC ........ *H04N 5/4403* (2013.01); *H04N 2005/443* (2013.01)
USPC .......................................................... 348/734
(58) Field of Classification Search
USPC ................. 348/563–566, 734, 552, 553, 725; 345/175, 176–184, 156; 715/716, 722
See application file for complete search history.

(56) References Cited

U.S. PATENT DOCUMENTS

| | | | | |
|---|---|---|---|---|
| 5,594,469 | A * | 1/1997 | Freeman et al. | 345/158 |
| 7,911,456 | B2 * | 3/2011 | Gillespie et al. | 345/174 |
| 8,253,746 | B2 * | 8/2012 | Geisner et al. | 345/474 |
| 8,416,217 | B1 * | 4/2013 | Eriksson et al. | 345/175 |
| 8,564,544 | B2 * | 10/2013 | Jobs et al. | 345/173 |
| 8,693,848 | B1 * | 4/2014 | Pacor et al. | 386/296 |
| 2007/0182595 | A1 * | 8/2007 | Ghasabian | 341/22 |
| 2011/0090407 | A1 * | 4/2011 | Friedman | 348/734 |
| 2012/0179970 | A1 * | 7/2012 | Hayes | 715/722 |
| 2012/0204106 | A1 * | 8/2012 | Hill et al. | 715/716 |
| 2013/0019263 | A1 * | 1/2013 | Ferren et al. | 725/37 |
| 2014/0053180 | A1 * | 2/2014 | Shoykher | 725/14 |
| 2014/0059615 | A1 * | 2/2014 | Sirpal et al. | 725/52 |

FOREIGN PATENT DOCUMENTS

WO    WO 2013/188796 A2    12/2013

OTHER PUBLICATIONS

"The All New Remote. Put your iPhone, iPad, or iPod touch in charge of the show," Apple, Inc., 2013, https://www.apple.com/apps/remote/.
"Custom Receiver Application," GoogleCast, Google Developers, Mar. 14, 2013 https://developers.google.com/cast/docs/custom_receiver.

* cited by examiner

*Primary Examiner* — Paulos M Natnael (57) ABSTRACT

Systems and methods for personalized video display include providing an interface on the touch device, maintaining a layout template that includes a primary video display window and a user selectable information window, and send the layout template to the television. The television can display the template layout and embedded content. Additionally, the touch device can detect gestures from a user and communicate instructions to the television based on the gesture input.

20 Claims, 9 Drawing Sheets

SYSTEMS AND METHODS FOR REMOTE CONTROL OF A TELEVISION

FIELD OF THE DISCLOSURE

The present disclosure generally relates to a remote control system and method.

BACKGROUND

Smart televisions greatly expand the content available for viewing on the television and can simplify the entertainment center setup. Smart televisions can be connected to the internet through a hard wired connection or a wireless connection. Access to the internet enables access to a wide variety of content available online, including video-on-demand services such as Netflix, Hulu, Amazon Prime, and the like, as well as user provided content such as YouTube, Vine, and the like. In addition to video content, there is a large amount of audio and image content available through the internet. While the internet provides a vast source of content, smart televisions can also receive content from traditional sources, such as over-the-air broadcast, cable or satellite providers, game consoles, DVD or Blu-ray players, and the like, through a variety of input ports, such as HDMI, composite video, component video, coaxial connectors, VGA connectors, and the like. Additionally, smart television can access physical digital media, such as hard drives, flash drives, SD cards, and the like.

With the vast array of content accessible by a smart television, it will be appreciated that a need exists for interacting with smart televisions.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

For purposes of this disclosure, a information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a PDA, a consumer electronic device, a network server or storage device, a switch router, wireless router, or other network communication device, or any other suitable device and can vary in size, shape, performance, functionality, and price. The information handling system can include memory, one or more processing resources such as a central processing unit (CPU) or hardware or software control logic. Additional components of the information handling system can include one or more storage devices, one or more communications ports for communicating with external devices as well as various input and output (I/O) devices, such as a keyboard, a mouse, and a video display. The information handling system can also include one or more buses operable to transmit communications between the various hardware components.

Figure 1:
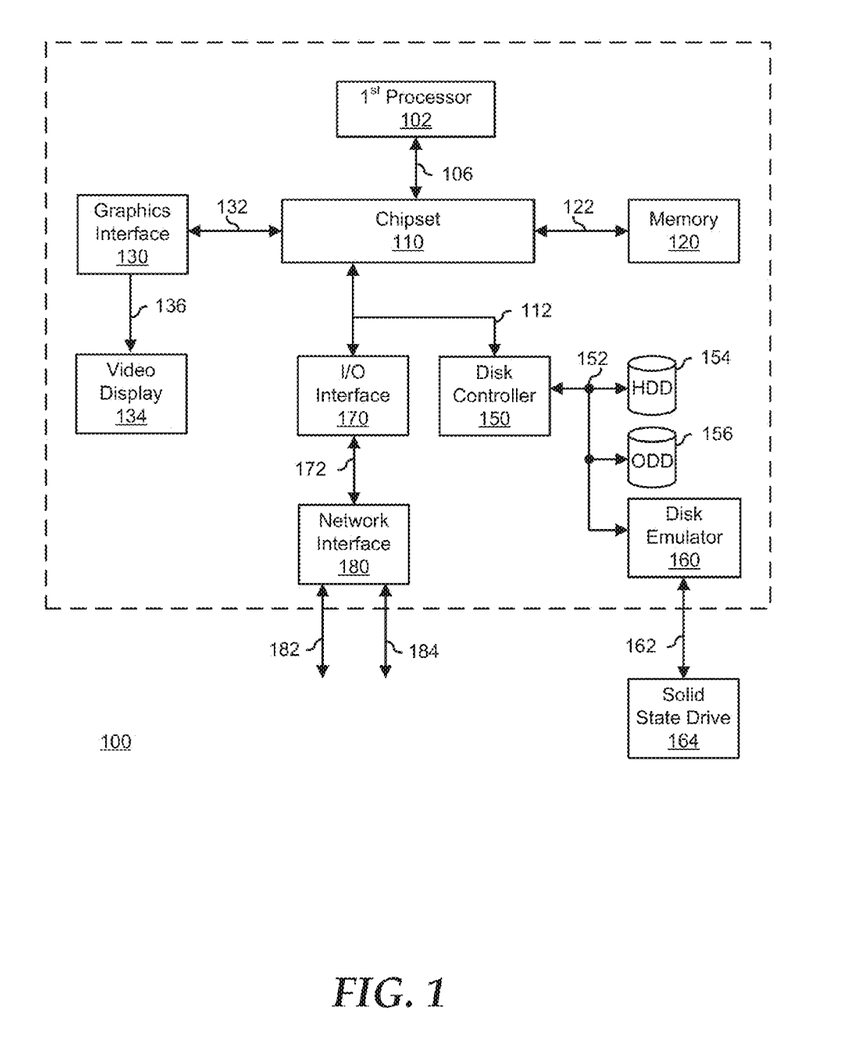
FIG. 1 is a block diagram of an exemplary information handling system.

FIG. 1 illustrates a generalized embodiment of information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a smart television, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above, and operates to perform one or more of the described methods. Information handling system 100 includes a processors 102, a chipset 110, a memory 120, a graphics interface 130, a disk controller 150, a disk emulator 160, an input/output (I/O) interface 170, and a network interface 180. Processor 102 is connected to chipset 110 via processor interface 106. Memory 120 is connected to chipset 110 via a memory bus 122. An example of memory 120 includes random access memory (RAM) such as static RAM (SRAM), dynamic RAM (DRAM), non-volatile RAM (NV-RAM), or the like, read only memory (ROM), another type of memory, or a combination thereof. Graphics interface 130 is connected to chipset 110 via a graphics interface 132, and provides a video display output 136 to a video display 134.

Disk controller 150 and I/O interface 170 are connected to chipset 110 via an I/O channel 112. Chipset 110 can also include one or more other I/O interfaces, including an industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1194 (Firewire) interface, a proprietary interface, or a combination thereof. Alternatively, solid-state drive 164 can be disposed within information handling system 100.

I/O interface 170 includes a peripheral interface 172 that connects the I/O interface to network interface 180. Peripheral interface 172 can be the same type of interface as I/O channel 112, or can be a different type of interface. Network interface 180 represents a NIC disposed within information handling system 100, on a main circuit board of the information handling system, integrated onto another component such as chipset 110, in another suitable location, or a combination thereof.

Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Alternatively, network channels 182 and 184 can be wireless communications channels, such as Wi-Fi, Bluetooth, or the like. Network channels 182 and 184 can be connected to external network resources (not illustrated). The network resource can include another information handling system, a data storage system, another network, a grid management system, another suitable resource, or a combination thereof.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing or encoding a set of instructions for execution by a processor or that cause a computer system to perform any one or more of the methods or operations disclosed herein.

In a particular non limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures. Moreover, if a claim is intended to invoke section 112(f) of 35 USC, the claim will include the exact phrase "means-for" or "step-for".

In various embodiments, an information handling system may utilize a touch sensitive display assembly for the combined functionality of the video display and input devices such as mouse and keyboard. Various technologies are known in the art thr detecting touch inputs, such as capacitive touch detection, resistive touch detection, surface acoustic wave detection, infrared grid detection, optical imaging, acoustic pulse recognition, infrared acrylic projection, dispersive signal detection, and planar scatter detection. The touch detection technology can rely upon emitters, detectors, or connections around the edge of the display, and it can be desirable to obscure those emitters, detectors, or connections.

In various embodiments, a trackpad can be implemented with a touch-sensing planar digitizer input device used instead of, or in conjunction with, a mouse, trackball or joy stick. During use, a user can place a finger on the trackpad and can move the finger along the touch-sensing planar surface. The trackpad can detect the movement of the finger and, in response, can provide motion signals to a communicatively coupled device. In operation, a trackpad software program can convert the detected movement pattern into specific cursor control signals (e.g., location, direction and magnitude of motion).

Trackpad sensor devices can be, for example, resistive and/or capacitive in their operation. In various embodiments, a resistive trackpad sensor can be a mechanical sensor that uses two layers of material that are separated by air. Pressure from a finger can push the top layer (such as a thin, clear polyester film) so that it touches the bottom layer (which may be, for example, glass). The voltage at the contact point can be measured and the finger's location can be computed and transmitted to a connected system. After the finger is removed, the top layer can return to its original configuration.

In various embodiments, a capacitive touchpad sensor may be implemented as a solid-state sensor made using printed circuit board ("PCB") technology and/or a flex circuit of glass substrate technology. A finger on, or in close proximity to, a top grid of conductive traces can change the capacitive coupling between adjacent traces. This change in capacitance can be measured and finger position can be computed.

In various embodiments, a designer may elect to create a touchpad for a remote device using the touch screen of a smartphone, tablet, or other device to act as the trackpad surface. There may be, for example, three components used in such a solution: the touch sensor, the controller, and software. The touch sensor can be implemented as a panel with a touch responsive surface. Such a system may be built based on different types of sensors: resistive, surface acoustic wave, capacitive, infrared, frustrated total internal reflectance, or the like. In various embodiments, the chosen sensor can have signals running through it and touching the screen can cause a signal change. The signal change can be used to determine the location of the touching. The controller can include hardware that converts the signal changes on the sensor into information about the location of the touch that a computing or other device can receive and use. The software can perform an action based on the information coming from the controller.

In one system incorporating teachings of the disclosure, a multi-component system can allow a smartphone or tablet to act as a touchpad interface for a remote device such as a television. A designer of such a system may make various design and/or implementation decisions that incorporate the disclosed teachings even if the system as finally implemented does not look like one of the figures included herein. In one system, a designer may make use of a touch sensor on a smartphone or tablet, a controller (which may be electronic components within the smartphone or tablet), software (which may be a launchable application stored on the smartphone or tablet), an additional launchable application (which may be stored on a remote device like a television), and various wireless enabled communication devices (which may comply with Wi-Fi, Bluetooth, and/or some other communication protocol and may be incorporated within devices such as the smartphone or tablet, the television, a dongle configured for attachment to the smartphone, tablet, or television, a wireless router, or the like).

In various embodiments, an application can be pre-loaded or made available for downloading to a touch device, such as smartphone or tablet. With the application loaded, the application may recognize a signal from a controller on the touch device as indicative of a touch or near touch at a given location on the touchscreen, which may be mapped as an X-Y coordinate. The application may be capable of communicating with a remote device and/or an additional application loaded on a to-be-controlled device (e.g., a television and/or a dongle or set top box, attached to a television). The application and the additional application may be calibrated to allow the X-Y coordinates that are associated with the location touched by a user on the touchscreen of the controlling device to be mapped to a set of X-Y coordinated that are associated with all or a portion of the screen of the to-be-controlled device.

In various embodiments, a user may be able to separate a television screen into one or more windows. If the user has set the television to have one window that encompasses the entire viewing area of the television, the X-Y coordinate system used by the additional application may cover the entire screen. If a user has separated the viewing area into two windows, the additional application may maintain a first set of X-Y coordinates for one of the windows and a second set of X-Y coordinates for the other window. In such a system, the touch device application may allow the user to indicate which of the two windows the trackpad should be mapped to, and the additional application can, in response, indicate cursor movement in the to-be-controlled window.

As an example of a two window viewing experience, a user can watch a live sporting event in a large window that is maintaining a 4:3 viewing perspective. The television can be a wide screen television with a 16:9 viewing area ratio. In various embodiments, Window 1 may be open and showing the sporting event on the left side of the screen. Given the viewing ratios, Window 2 may be created on the right side of the screen. In some cases, the user can have a social media feed available in Window 2. For example, a user can be watching a game at the same time a group of friends are watching the same game at other locations. The group of friends can open a group text to talk about the game and the various group text messages may appear in Window 2.

As the user is watching television, the user may want to use an application that offers a trackpad mode while executing on a touch device. The trackpad mode of the application may allow the user to "point" and/or "select" elements appearing in Window 1, Window 2, and/or additional windows. The trackpad mode of the application may allow the user, for example, to switch between Window 1 control and Window 2 control. In various embodiments, an application (which may be the one on the tablet and/or one on the television) may access a mapping table to link the X-Y coordinate associated with the location touched on the tablet with a corresponding location within Window 1 or 2. Moreover, the application running on the touch device may recognize that the given window selected via the trackpad includes content that allows for and/or requires an inputting of textual data. For example, if a user touches a trackpad location and selects a window presenting a social media feed, the application may switch from trackpad mode to a textual input mode. In some embodiments, the textual input mode may include a keyboard or partial keyboard that is presented "on top" of the trackpad screen. In practice, the trackpad screen may appear as a black screen with or without a right and left mouse click portion. Moreover, the trackpad mode may be entered automatically in response to "throwing" the application display area content to a television, in response to a user gesture on the touchscreen indicating a desire to enter a trackpad mode, and/or after some pre-defined amount of time has passed following a triggering event (e.g., five seconds after throwing the display area to a television). In practice, the pre-defining of time may be built into the application and/or adjusted by a user with an edit option of the application.

Figure 2:
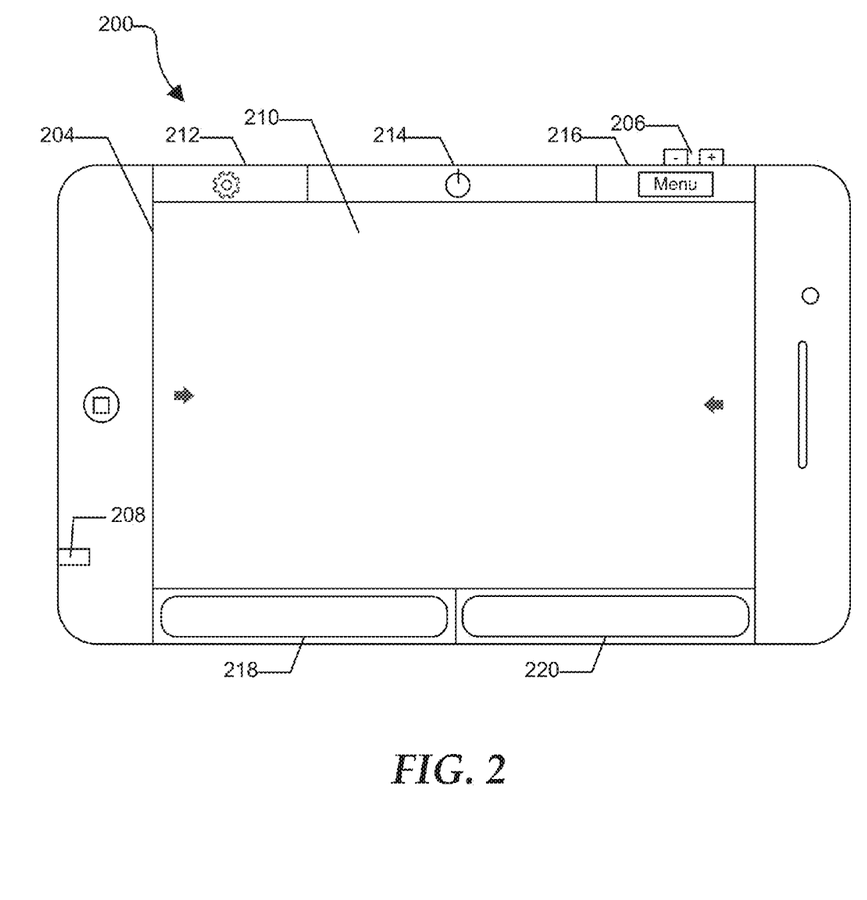
FIG. 2 is a block diagram of an exemplary touch device.

FIG. 2 illustrates a block diagram of an exemplary touch device, generally designated 200, with an interface for remote control of a smart television. In exemplary embodiments, the touch device can be a smart phone, such as a iPhone, an Android phone, a Windows 8 phone, or the like, a tablet, such as an iPad, an iPod Touch, an Android tablet, a Microsoft Surface, or the like, or other device with a touch sensitive display. The touch device 200 can have a touch sensitive display 204 upon which the interface is displayed. Additionally, the touch device 200 can have volume control buttons 206 and a head phone port 208.

The interface of touch device 200 can include a gesture area 210 operable for receiving gestures. In various embodiments, the gestures can be used to control a cursor on the smart television, make a selection on the smart television, alter the arrangement of the information displayed on the smart television, and the like. In particular embodiments, the gesture area 210 can be substantially free of graphic content, such as by having a solid black background. Alternatively, the gesture area 210 may include graphical or textual content that is substantially different than the graphical or textual content displayed on the smart television. For example, the gesture area 210 may display graphical and textual clues to guide a user in operating the interface, such as images of available gestures.

The interface of touch device 200 can include selection elements 212, 214, 216, 218, and 220. Upon a touch received at one of selection elements 212, 214, 216, 218, and 220 the touch device can perform a specific operation associated with the selection element.

Selection element 212 can be a settings selection element. In various embodiments, when selection element 212 is activated, such as by a touch registered at the corresponding area of the touch sensitive display 204, a settings interface can be displayed on the touch device. Alternatively, a settings interface can be displayed on the television. The settings interface may be used to adjust settings related to the operation of the touch device, the operation of the television, or the interaction between the touch device and the television.

Selection element 214 can be a power selection element. In various embodiments, when selection element 214 is activated, such as by a touch registered at the corresponding area of the touch sensitive display 204, the touch device can send an instruction to the television to cycle the power. For example, when the television is in an "on" state, the instruction can cause the television to enter into a "standby" or "off" state. Alternatively, when the television is in the "standby" state, such that the television is still capable of communicating with the touch device, but the display is powered off, the instruction can cause the television to enter into the "on" state.

Selection element 216 can be a menu selection element. In various embodiments, when selection element 216 is activated, such as by a touch registered at the corresponding area of the touch sensitive display 204, a menu can be displayed on the touch device. Alternatively, the menu can be displayed on the television display. In particular embodiments, the menu can display a list of applications available on the smart television, such as Netflix, Hulu, YouTube, a web browser, or the like. The applications can enable the smart television to access content unavailable to a traditional television, such as content that is available through the internet. Additionally, the applications may enable the smart television to perform various additional tasks, such as interactive games and the like.

Selection elements 218 and 220 can behave like buttons on a mouse, such as the left and right buttons respectively. For example, when a cursor on the display of the television is at an chosen application in the app menu, activation of selection element 218 can launch the chosen application. Similarly, when using a web browser application on the television, activation of selection element 218 can follow a hyperlink on a displayed webpage. In various embodiments, activation of selection element 220 can bring up a contextual menu, such as to provide the option to open the hyperlink in a new window, add the page to a set of bookmarks, or the like. Alternatively, an application may use a "right mouse click" or activation of selection element 220 to perform a specific action rather than brining up a contextual menu.

In various embodiments, operation of volume control buttons 206 can cause the touch device 200 to instruct the television to adjust the volume. Alternatively, when headphones are plugged into the headphone port 208, the volume control buttons 206 can be used to control the volume of the headphones. In particular embodiments, the television may send an audio stream to the touch device 200, and the touch device 200 can provide playback of the audio stream to the headphones. In this way, an individual with limited hearing can use the headphones to provide improved heading while maintaining the volume of the television at a normal level. Additionally, an individual wanting to use the television without disturbing others in the vicinity could use mute the television and use the headphones to listen to the content on the television.

Figure 3:
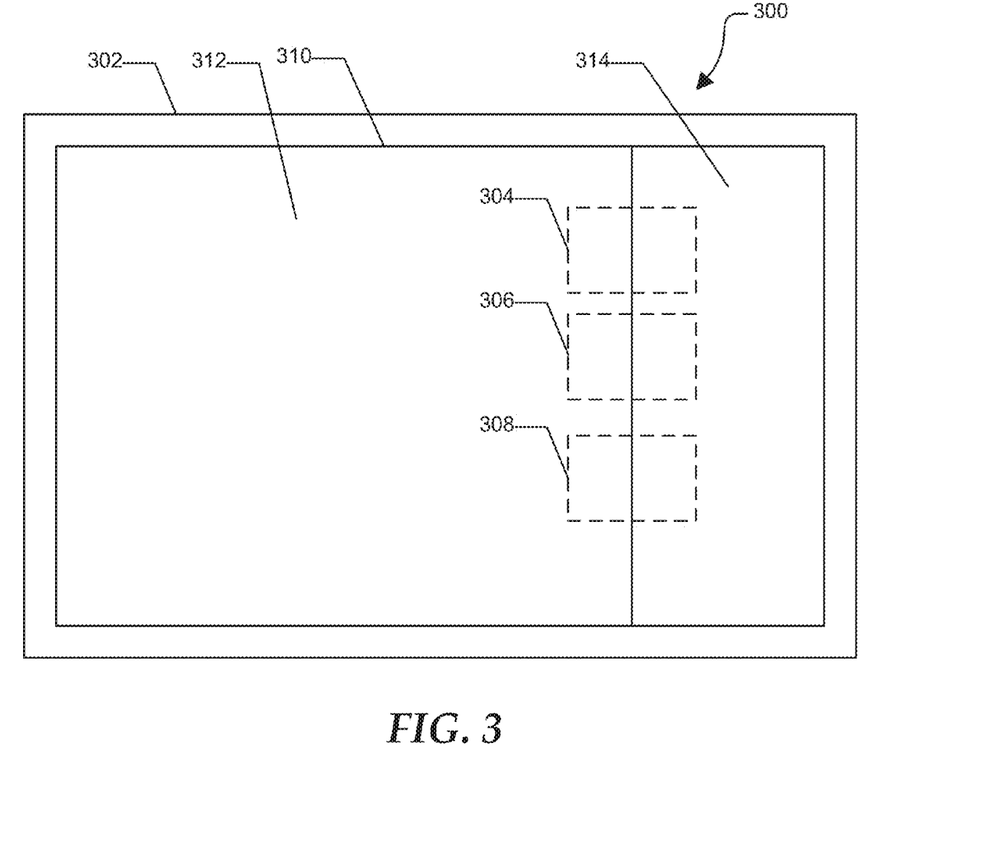
FIG. 3 is a block diagram of an exemplary smart television.

FIG. 3 illustrates a block diagram of a smart television, generally designated 300. The smart television 300 can include a housing 302, a processor 304, a memory 306, a wireless communications interface 308, and a display 310. The processor 304 can be configured to decode and playback on the display 310 content that is available through traditional television interfaces, such as HDMI, component video, composite video, and the like, and content available through a network, such as a network accessed by the wireless communications interface 308. Additionally, processor 304 can access content, such as video content, applications, and the like, stored in the memory 306. Additionally, memory 306 can store instructions for the operation of the processor 304, as well as settings, credentials for communication with remote devices, and other information necessary for the operation of the smart television 300.

In various embodiments, the display 310 can provide multiple viewing areas, such as primary video display area 312 and user selectable display area 314. The primary video display area 312 can provide an area for the playback of video content. The user selectable display area 314 can provide an area for display of supplemental information. The supplemental information can include information about the video content, such as directors, actors, plot summary, ratings, suggestions for related video content, and the like. Alternatively, the supplemental information can display information from social media, such as a Twitter feed, a Facebook timeline, or the like. The social media content may be related to the video content, or may be unrelated to the video content. For example, when watching a broadcast of a live sporting event, a user's Twitter feed may be displayed. The user may, for example, follow the Twitter account of one of the sporting teams and receive social media content related to the sporting event. Additionally, the user may follow the twitter account of individuals not associated with either of the teams, and may receive social media content unrelated to the sporting event. Additionally, the user may interact with others by tweeting about the sporting event or other things. In particular embodiments, the displayed Twitter feed may be filtered to only display content with hashtags related to the sport, teams playing in the sporting event, and the sporting event, thereby limiting the displayed social media content to content related to the sporting event.

In various embodiments, the display may be further divided into additional video display areas or additional user selectable information display areas. Additionally, the number of display areas, and the relative positioning of the various display areas may be a user adjustable parameter. In some embodiments, a user may have a smartphone and/or tablet application executing on an appropriate device (such as the one depicted in FIG. 9). The application may be customizable by the user before and/or after the application has been loaded onto a touch device. The application may facilitate the user's ability to control and/or personalize a smart television viewing experience. For example, the application may be implemented using a system like Google's Chrome and may work with a television dongle such as Google's Chromecast. Moreover, the application may be part of a larger cloud-based system.

A user may be able to access a website, enter personal log-in credentials, and see a web presented version of the user's "my Television" application. The user may be able to utilize the website and/or their own touch device to create a customized interface for the application with multiple windows, and each window may offer the user a given and/or pre-selected range of content feed options. In such an embodiment, a local instance of the my Television application may be launched, for example, on a tablet, and the user may throw the application's personalized screen to a television via a dongle connected to a television, a set top box or game console connected to a television, and/or the television itself. In some cases, the television may "receive" the personalized screen as a template with defined windows and URL's or other identifiers for remote sources of the content intended to populate a given window. In some cases, the my Television application may recognize that content has been thrown to a television device and may switch into a trackpad mode. The switch may happen automatically and/or in response to some user interaction with the tablet.

In various embodiments, the display area of each window may have a unique coordinate space, such as defined by X, Y coordinates. Using the X,Y coordinate space of each display area, gestures detected by the touch device can be mapped to locations within a display area. In various embodiments, each display area can have an independent coordinate space, such that a selection of an active display area could allow the application to map a location on the touch device to a location within the active display area. For example, the upper left hand corner of each display area can be defined as 0,0, thus multiple locations on display 310 can be addressed by the same coordinate pair and distinguished by a third value representing the selected display area. Alternatively, the display areas can share a common coordinate system based on a coordinate system for display 310. For example, the upper left hand corner of the display can be defined as 0,0, and the upper left hand corner of each window can be defined by the relative position on the display 310. Thus, each coordinate pair can uniquely address a location within the display.

Figure 4:
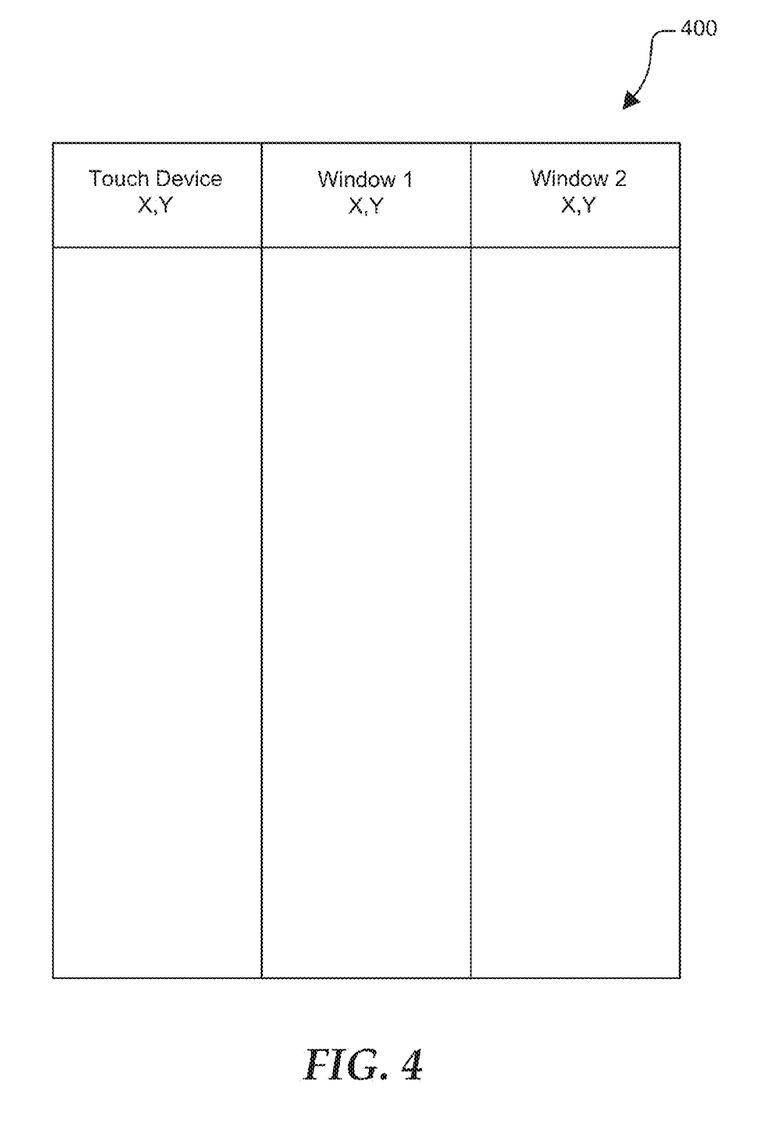
FIG. 4 is a diagram illustrating an exemplary coordinate mapping table.

FIG. 4 illustrates an exemplary table, generally designated 400 for mapping the X,Y coordinates of the touch device to display areas of the television. When a gesture is detected the gesture area of the touch device, the coordinates of the gesture on the touch device can be mapped to the coordinates within an active display area on the television and the touch device can send an instruction to the television to perform an action at that location of the active display area. For example, a user could drag a finger across the gesture area to control a pointer on the television. The movement of the detected touch area through the coordinate space of the gesture area can be mapped to the display area and transmitted to the television so the movement can be replicated by the movement of the cursor. Thus, rather than moving through an array of icons on the television by moving left/right, up/down, the cursor can move in any direction including diagonally to more efficiently navigate to the desired icon. Alternately, a touch at a particular location on the gesture area can be translated to a corresponding location of the active display area. Thus, rather than moving a cursor around the display area to find a desired icon, the cursor or selection element can jump directly to an icon at the location corresponding to the location of touch, making the selection of the icon potentially more efficient.

Figure 5:
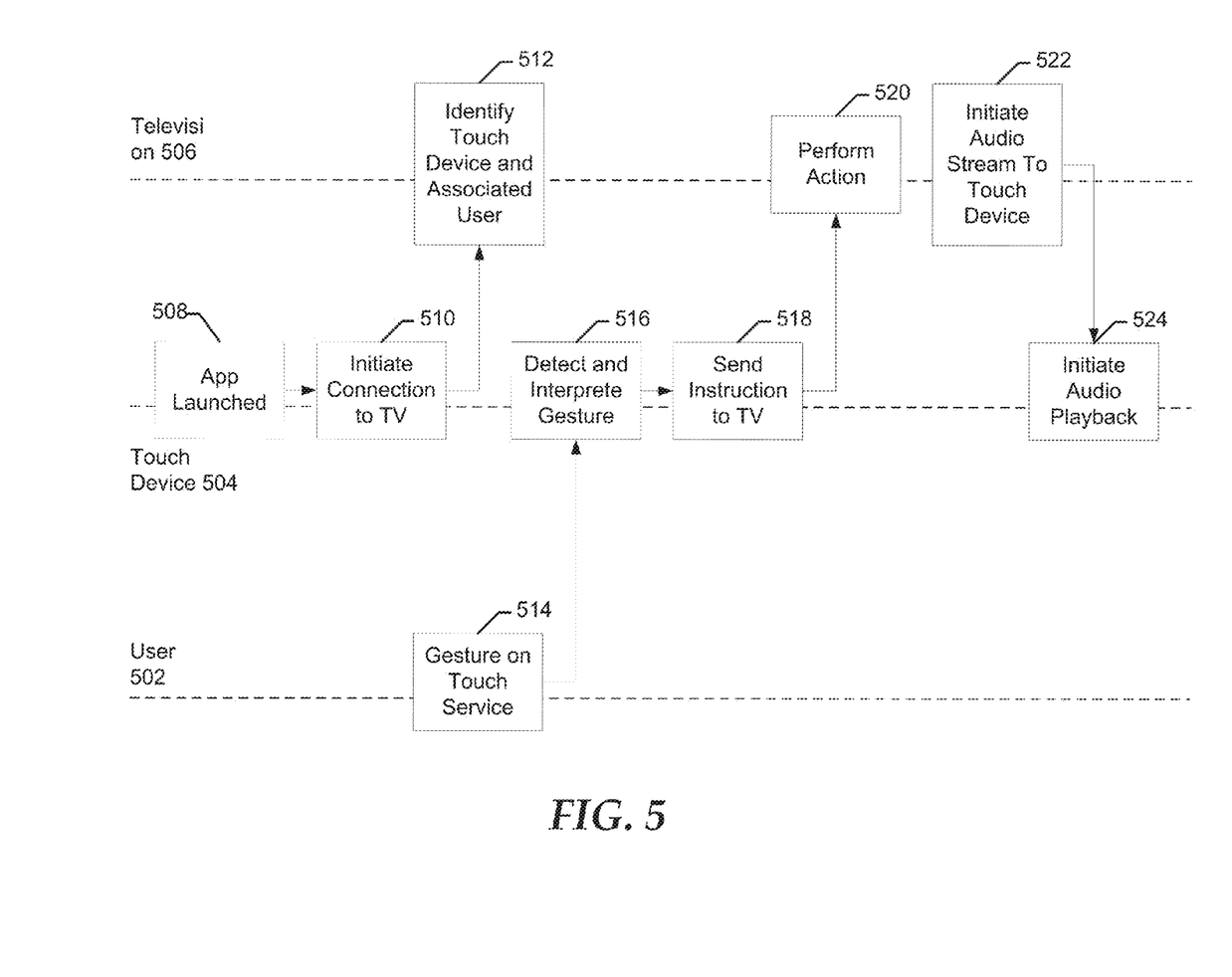
FIGS. 5, 6, 7, and 8 are flow diagrams illustrating exemplary methods of controlling a television remotely with a touch device.

FIG. 5 illustrates a flow diagram, generally designated 500, illustrating the interaction between a user 502, a touch device 504, and a smart television 506. At 508, an application for controlling the smart television can be launched on the touch device. Once launched, the application can initiate a connection to the television 506, as illustrated at 510. At 512, the television can identify the touch device and the associated user. In various embodiments, establishing the connection between the touch device and the television may require authentication of the touch device, which can be used to identify the touch device. Additionally, when a touch device is first paired with the television, a user account can be associated with the touch device. The user account can be used to maintain user specific settings, such as the arrangement of the display areas on the television display, relevant parental control limits, credentials for connecting to various online accounts, such as video-on-demand services like Hulu, Netflix, or the like, social media services, like Twitter, Facebook, or the like, cloud storage accounts like Dropbox, iCloud, Amazon Cloud Drive, or the like.

At 514, the user 502 can make a gesture on the touch sensitive display surface, such as in the gesture area or by touching a selection element. At 516, the touch device 504, can detect and interpret the gesture, and, at 518, the touch device 504 can send an instruction corresponding to the gesture to the television 506. In various embodiments, the gesture can have an associated gesture identity, such as determined by the pattern and relative movement of touches detected by the touch surface, and an associated location. Based on the associated gesture identify and location, the gesture can be interpreted by the touch device to represent one of a variety of commands. For example, a swipe of a finger to the right can be interpreted as a request for a summary of a show, while a swipe of a finger downward can be interpreted as a request for a television viewing guide. Additionally, multi-finger gestures, such as a pinch, may be interpreted as a request for zooming in or enlarging an image or display area. At 520, the television 506 can perform an action associated with the instruction.

At 522, the television 506 can initiate an audio stream to the touch device 504, and at 524, the touch device can provide playback of the audio stream, such as through a set of headphones. In various embodiments, the audio stream can be communicated from the television 506 to the touch device 504 via a Bluetooth connection, a Wi-Fi connection, an IR beam, an RE broadcast, or other various forms of digital or analog communications.

Figure 6:
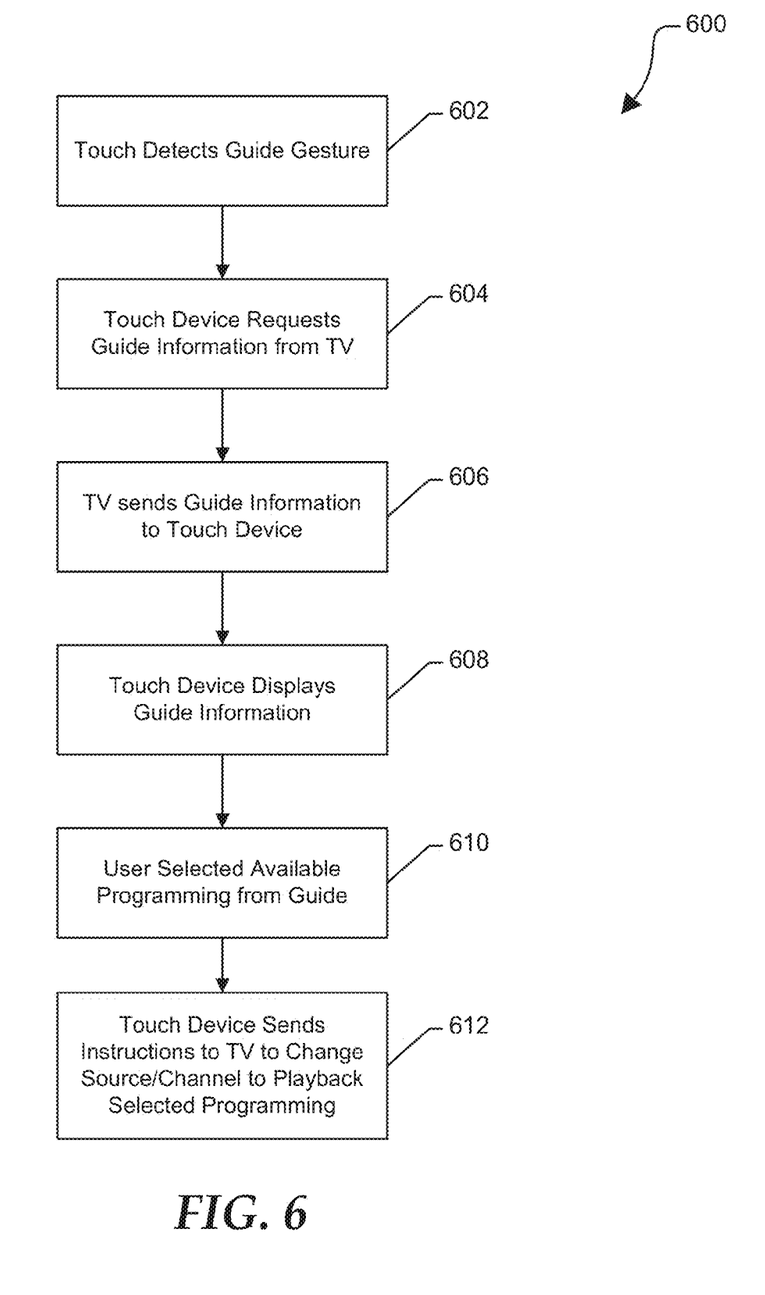

FIG. 6 illustrates a flow diagram of an exemplary method of controlling a television with a touch device, generally designated 600. At 602, the touch device can detect a guide gesture on the touch sensitive display. In various embodiments, the guide gesture may be a swipe of a finger, such as in a downward direction. At 604, the touch device can request guide information from the television, and at 606, the television can send the guide information to the touch device. In particular embodiments, the television may have access to information regarding currently available programming from a cable provider or from an over the air digital broadcast. In alternative embodiments, the touch device may retrieve the guide information independently from the television, such as directly from the cable provider via an internet connection.

At 608, the touch device can display the guide information on the touch sensitive display. The user may be able to scroll through or search the guide information to identify a particular content, channel, or content source, and the user can select available programming from the guide, as illustrated at 610, such as by tapping the content description in the guide. At 612, the touch device can send instructions to the television to change a source or channel to playback the selected programming. In alternate embodiments, the guide information may be displayed on the television, and the touch device may be used to scroll through and select the desired programming.

In various embodiments, the guide information can combine information from multiple content sources. For example, the guide information can include traditional guide information such as listing of channels and show times for various live programming. Additionally, the guide can include content from video-on-demand services offered by a cable provider or other video-on-demand content. The guide may also include various channels of content available through the internet, such as YouTube channels, internet radio channels, or the like. Combining information from various sources may improve the ability of the user to locate and identify desirable content.

Figure 7:
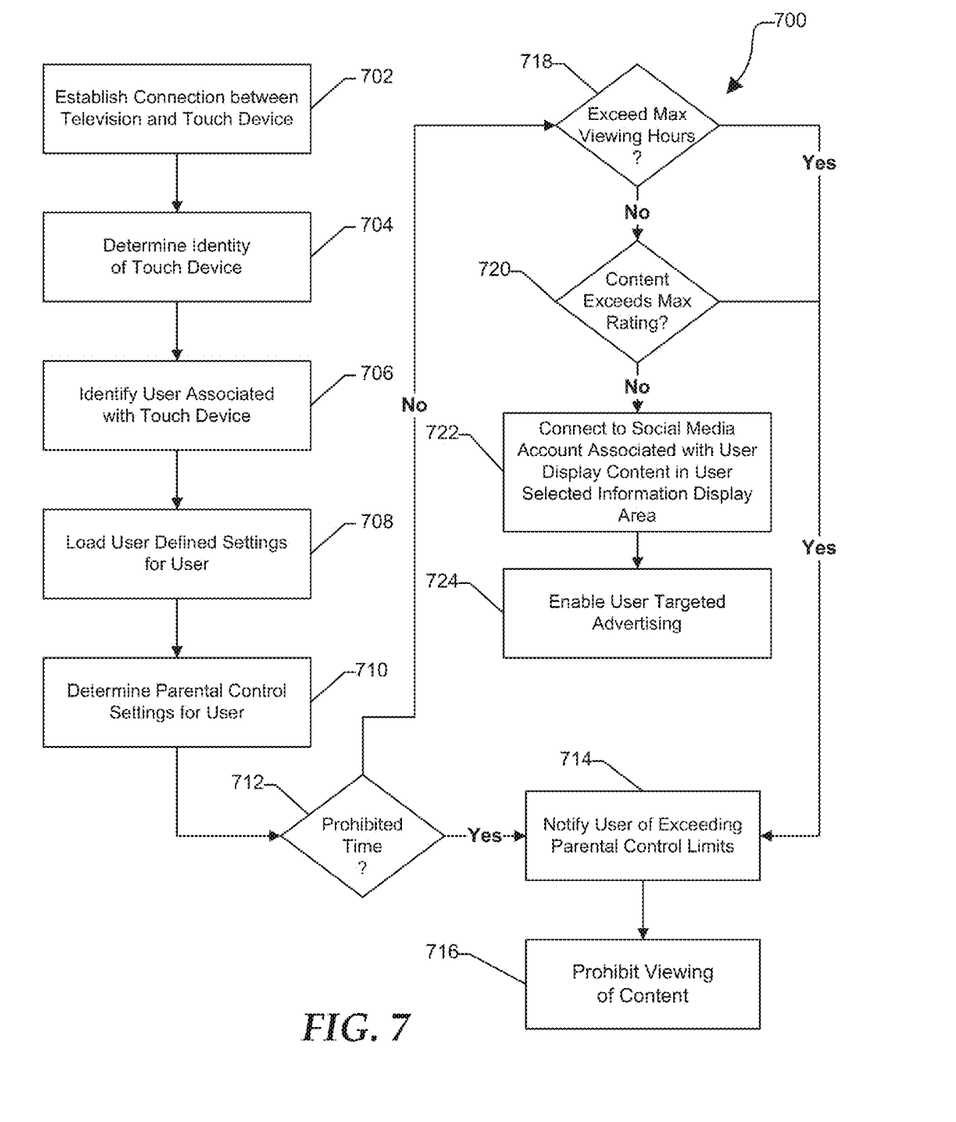

FIG. 7 illustrates a flow diagram of an exemplary method of providing a user specific experience for television viewing, generally designated 700. At 702, a connection is established between a touch device and a television. At 704, the identity of the touch device can be established. In various embodiments, the identity of the touch device may be established based on an authentication between the touch device and the television while establishing the connection. In alternative embodiments, the identity of the touch device may be determined based a unique identifier of the touch device, such as a MAC address, UDID (unique device identifier), or the like.

At 706, a user associated with the touch device can be identified based on the identity of the touch device. In various embodiments, when a touch device pairs with the television for the first time, the touch device can be associated with a user account on the television. The user account can be used for user specific settings, such as favorite channels, display layout, etc. The user account can also be used to maintain social media account credentials and to monitor and enforce parental control settings for the user. At 708, the user defined settings for the user associated with the touch device can be loaded, and at 710, parental control settings for the user can be determined.

At 712, a determination can be made if the user is attempting to view content on the television at a prohibited time. For example, the parental control settings may prohibit the user from watching television between the hours of 10 pm and 6 am. If the time is a prohibited time, the television can notify the user of a violation of the parental controls, as illustrated at 714, and prohibit the viewing of the content, as illustrated at 716.

Alternatively, when the time is not a prohibited time, or the parental controls have no prohibited time set, a determination can be made if the user is exceeding a maximum allowable number of viewing hours, as illustrated at 718. For example, the user may be limited to watching at most 2 hours of television a night during the week. When the maximum allowable number of viewing hours is exceeded, the television can notify the user of a violation of the parental controls, as illustrated at 714, and prohibit the viewing of the content, as illustrated at 716. In various embodiments, the television may notify the user when they are approaching the max allowable number of viewing hours, such as by notifying them five minutes before the limit is reached. This advanced warning can allow the user to save, pause, or quit a game, or stop playback of content on a device external to the television, such as a game console or DVD player.

Alternatively, when the maximum allowable number of viewing hours is not exceeded, or when no maximum allowable number of viewing hours is set for the user, a determination can be made if the rating of the content exceeds a maximum allowable rating, as illustrated at 720. For example, the user may be limited to viewing television content rated TV-PG or lower and movie content rated PG or lower. When the rating of the selected programming is higher than the maximum allowable rating, such as when the television content is rated TV-M or the movie content is rated. R, the television can notify the user of a violation of the parental controls, as illustrated at 714, and prohibit the viewing of the content, as illustrated at 716.

Alternatively, when the content does not exceed the maximum allowable rating, or when no maximum allowable rating is set for the user, the television can connect to a social media account associated with the user and display information from the social media account in the user selected information display area, as illustrated at 722. Additionally, the television can enable user targeted advertising to select advertising specific to the user, as illustrated at 724.

Figure 8:
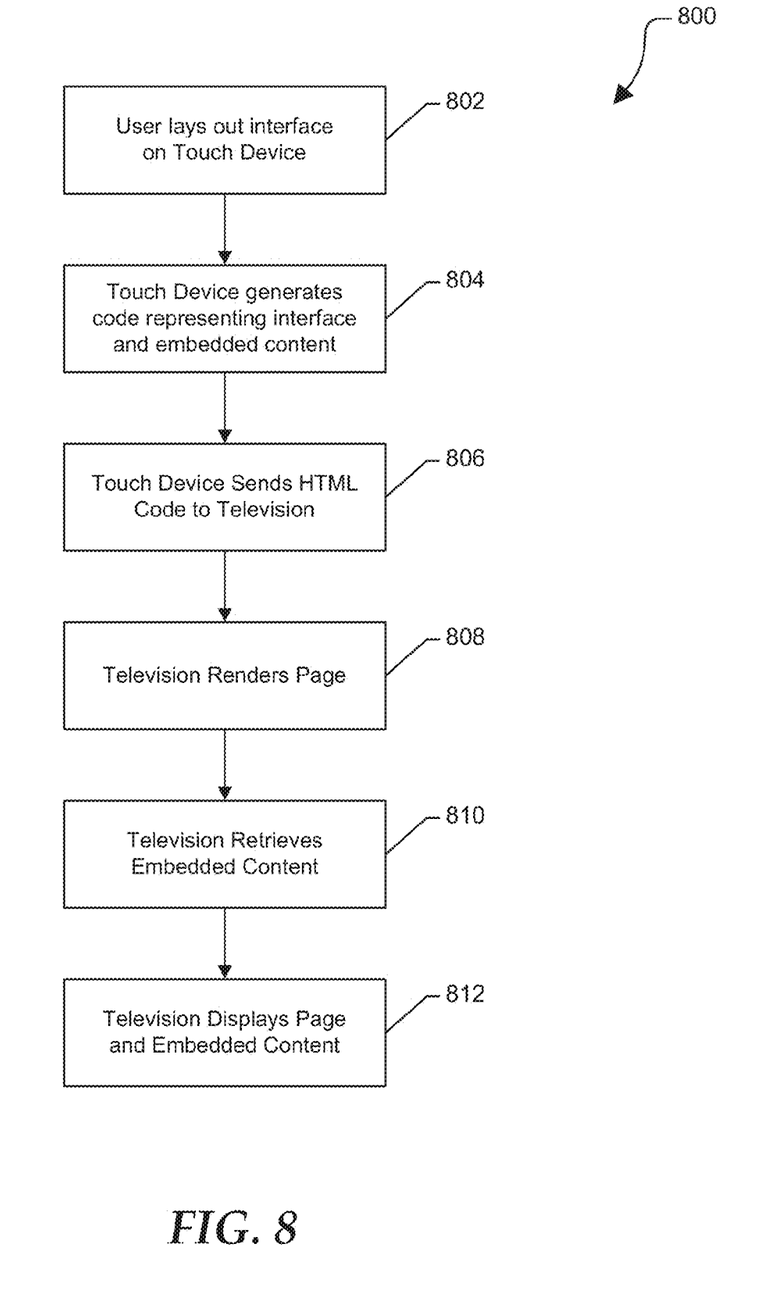

FIG. 8 illustrates a flow diagram of an exemplary method of displaying content in a user defined layout, generally designated 800. At 802, a user can layout an interface on the touch device. In various embodiments, the user can define one or more display areas or windows, adjust the size and arrangement of the display areas, and define the content to be embedded in each display area. For example, a first display area can be designated for displaying a streaming video feed of a sporting event and be pinned to the upper left corner, a second display area can be designated for displaying a group text feed and be pinned to the right side, and a third display area can be designated tier displaying living stats from the sporting event and can be pinned to the bottom of the display. The user can adjust the aspect ratio of the first display area, such as by selecting between 16:9, 4:3, 1.85:1, 2.35:1, or other aspect ratios. Additionally, the user may adjust the relative sizes of the first, second, and third display areas.

At 804, when the layout is complete, the touch device can generate code describing the layout. For example, the code can be HTML 5 code describing the arrangement of the display areas, and embedding links for the content to be displayed within those areas. In various embodiments, video content from various inputs to the television could be addressed using a modified URL. For example, rather than the URL directing to a web server for the content, the URL could direct the TV to the antenna and have a channel parameter, such as, for example, antenna:///channel_5. Alternatively, the television could address the various inputs similar to the way a URL can access a local file on a computer, such as, for example, file:///HDMI1 or file:///antenna/ch5.

At 806, the code can be sent to the television, and at 808, the television can processes the code, rendering the interface. The television can retrieve the embedded content for each display area from the appropriate source, as indicated at 810, and can display the embedded content within the appropriate display area on the television screen, as indicated at 812. In some embodiments, displayed content may include a selectable item and/or selectable area that is linked to additional information. For example, a video displayed in one window or display area may include an advertisement and/or an element of the video that a user wants to know more about. A user the may be able to utilize a touch device application trackpad mode to mouse over and select the advertisement or video element. Such a selection may be recognized as a request for more information. The additional information may be retrieved and used to populate one of the display areas of the defined layout. Depending on implementation detail, the television and/or the hone or tablet may retrieve the additional information. With reference to the example interface in FIG. 9, a user may select a scoreboard presented in the college football game rendered in Window 1. That selection may cause Window 3 to appear and to be populated with a scrolling list of scores for other college football games. In such an embodiment, the user may have pre-defined Window 3 as a springing window that "springs" into existence when a user indicates an interest in some element then appearing in Window 1 and/or Window 2. In some cases, the springing window may remain until a user indicates a desire to have it deleted and/or it may stay for some pre-defined amount of time.

The application may include several different modes. For example, the application may be operable in a stand-alone mode in which the smartphone or tablet presents a customized video layout on its own display. The application may also be operable in a trackpad mode. In some cases, the application may enter a trackpad mode in connection with a user "throwing" the customized video layout to a television. The application may also be operable in a textual input mode. In some cases, the application may enter the textual input mode when the application recognizes that a user has selected a display area that requires or allows typing. For example, if one of the display areas of the layout includes a social media feed (e.g., a group text feed), the application may recognize a user's "mouse"-ing over and selecting that portion of the layout as a desire to type a message. In such a system, in various embodiments, selecting the social media feed window may cause Window 3 to spring into existence and to allow the user to type, edit, modify, etc. a message before adding it to the social media feed. It will be apparent to those skilled in the art that a designer may choose to utilize a quasi-mirroring technique when throwing a my television display area to a television. For example, when the application is in standalone mode, the image presented on the tablet application may look nearly identical to the image on the television (if the display area is thrown to the television.) However, when the application enters trackpad mode and/or textual input mode, the image then presented on the tablet application may look nothing like the image displayed on the television.

Figure 9:
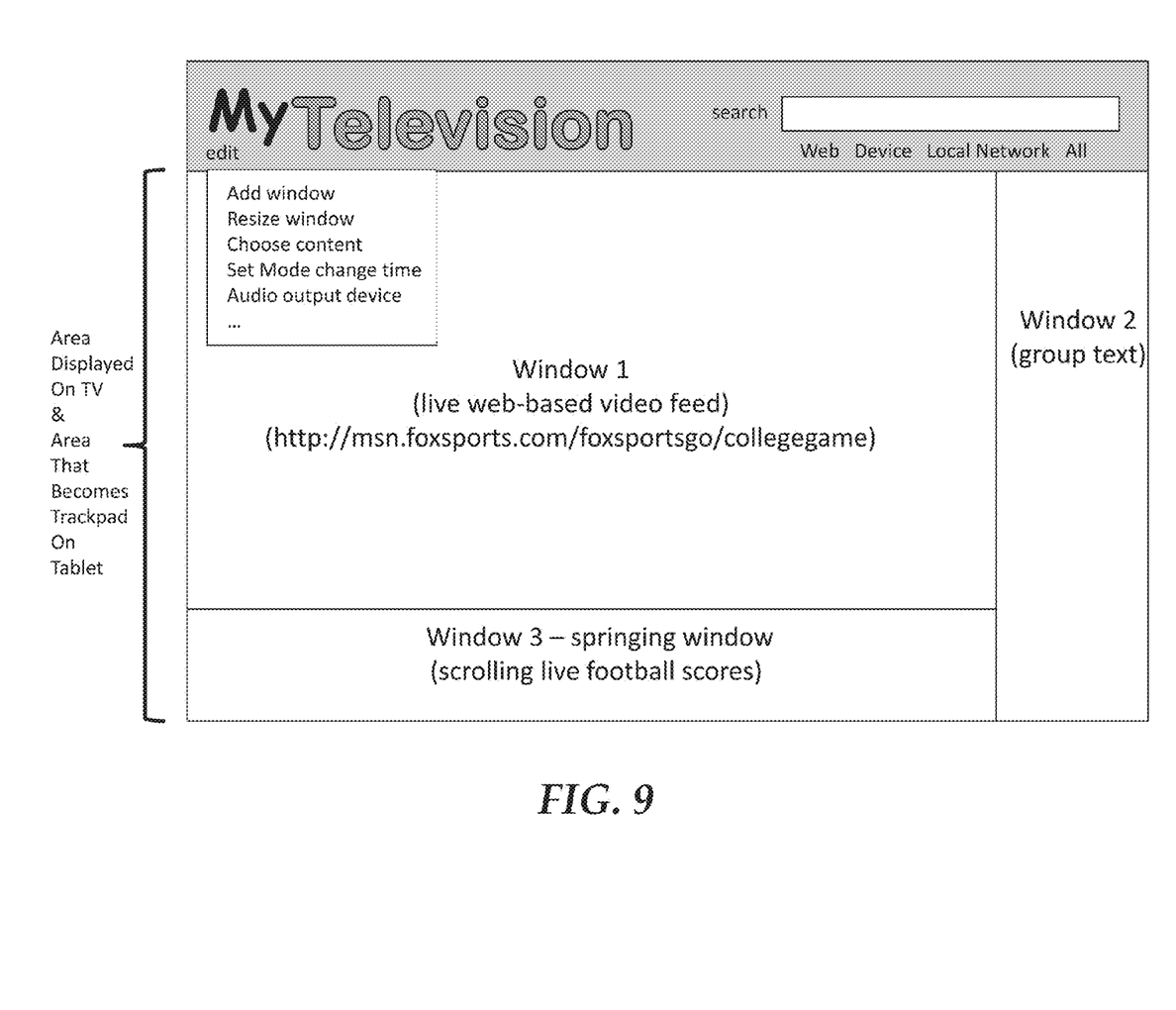
FIG. 9 depicts one example of a graphical user interface for an application incorporating teachings of the present disclosure.

As such, the image depicted in FIG. 9 may be one presented on a tablet application and/or a computer accessing a cloud-based service and creating a customized my television display. As shown, the GUI may allow a user to search the web, a local device memory, a local network of devices, etc. for content that can be used to populate a window. In addition, more or less windows could be included. Each of the windows could be implemented as re-sizeable windows. One or more of the windows may be designed as springing windows that do not always appear in the display area when the application is in use but rather spring into being in response to some triggering event. Various features of the display area may be edited. For example, a user may be able to toggle between the television and the tablet as the outputting device for audio. In various embodiments, the two or more windows may display video content, each with an associated audio stream. When multiple audio streams are present, the television may output audio from one audio stream and the tablet may output audio from a different audio stream.

The above description includes a great deal of novel teachings. A designer will recognize that the teachings can be combined in many different ways. For example, discussions associated with FIG. 1 may be combined with the discussions of any one or more of the other figures, and such a mixing and matching of the teachings is an intended use of the teachings.

What is claimed is:

1. A touch device, comprising:
   a touch sensitive display;
   a headphone port;
   a volume control;
   a wireless communications interface; and
   a processor configured:
   to establish a connection with a television through the wireless communications interface;
   to provide an interface on the touch sensitive display, the interface comprising a gesture area;
   to maintain a layout template that includes a primary video display window and a user selectable information window;
   to send the layout template to the television;
   to enter a trackpad mode that presents the gesture area in connection with sending the layout template to the television;
   to output audio associated with a video content presented in the primary video display via the headphone port and to adjust the volume of the headphone port in response to activation of the volume control;
   to detect a gesture input selecting the user selectable information area; and
   to send an instruction to the television based on the gesture input.

2. The touch device of claim 1, wherein the wireless communications interface is a Wi-Fi interface, a Bluetooth interface, a wireless USB interface, or a combination thereof.

3. The touch device of claim 1, further wherein the processor is configured to send an instruction to the television to adjust the volume in response to activation of the volume control.

4. The touch device of claim 1, further wherein the processor is configured to allow listening to the audio associated with the video content via the headphone port and to cause a muting of the audio associated with the video content via the television.

5. The touch device of claim 1, further comprising a power selection element, and the processor is further configured to send an instruction to the television to power down in response to detecting a power selection element touch by the user.

6. The touch device of claim 1, further wherein the processor is configured to allow a casting of the video content to the television.

7. The touch device of claim 1, further wherein the connection with the television occurs via a dongle communicatively coupled to the television.

8. A touch device, comprising:
   a touch sensitive display;
   a wireless communications interface; and
   a processor configured:
   to establish a connection with a television through the wireless communications interface;
   to provide an interface on the touch sensitive display, the interface comprising a gesture area;
   to maintain a layout template that includes a primary video display window and a user selectable information window, wherein the user selectable information window is configured to present at least a portion of a social media feed for a user;
   to send the layout template to the television;
   to enter a trackpad mode that presents the gesture area in connection with sending the layout template to the television;
   to detect a gesture input selecting the user selectable information area;
   to send an instruction to the television based on the gesture input; and
   to request at least a partial listing of available video content and to display the partial listing on the touch sensitive display in response to detecting a guide selection gesture by the user within the gesture area.

9. The touch device of claim 8, wherein the interface further comprises a menu selection element, and the processor is further configured to display a list of social media options available in response to detecting a menu selection element touch by the user.

10. The touch device of claim 8, wherein the interface further comprises a settings selection element, and the processor is further configured to provide an interface for altering a selection of content to be presented in the primary video display window in response to detecting a settings selection element touch by the user.

11. The touch device of claim 8, wherein the processor is further configured to detect a pinch-to-zoom gesture within the gesture area and to send an instruction to the television to resize the primary video display area in response to detecting the pinch-to-zoom gesture.

12. The touch device of claim 8, wherein the processor is configured to execute an application loaded on the touch device, further wherein the application comprises instructions that direct the processor to send the layout template, to enter a trackpad mode, and to detect the gesture.

13. The touch device of claim 12, wherein the application comprises additional instructions that direct the processor to maintain a credential for the user and to use the credential to gain access to the social media feed.

14. A touch device, comprising:
a touch sensitive display;
a wireless communications interface;
a processor; and
a memory storing an application that comprises a collection of instructions operable to direct the processor:
to establish a connection with a television through the wireless communications interface;
to provide an interface on the touch sensitive display, the interface comprising a gesture area;
to maintain a layout template that includes a primary video display window and a user selectable information window, wherein the user selectable information window is configured to present at least a portion of a social media feed for a user;
to send the primary video display window and the user selectable information window to the television;
to enter a trackpad mode that presents the gesture area in connection with sending the primary video display window and the user selectable information window to the television, wherein the gesture area encompasses the entire touch screen;
to detect a gesture input selecting the user selectable information area;
to send an instruction to the television based on the gesture input;
to request at least a partial listing of available video content and to display the partial listing on the touch sensitive display in response to detecting a guide selection gesture by the user within the gesture area; and
to display a list of social media options available in response to detecting a menu selection element touch by the user.

15. The touch device of claim 14, wherein the application comprises additional instructions that direct the processor to maintain a credential for the user and to use the credential to gain access to the social media feed.

16. The touch device of claim 14, wherein the application comprises additional instructions that direct the processor to enter the trackpad mode by dimming the touch screen to present a black display.

17. The touch device of claim 14, wherein the application comprises additional instructions that direct the processor to throw the screen view to the television in response to a user input and to enter the trackpad mode after throwing the screen view to the television.

18. The touch device of claim 14, further wherein the application comprises additional instructions that direct the processor to access at least a first URL to retrieve content for the primary video display window and at least a second URL to retrieve social media feed content for the user selectable information window.

19. The touch device of claim 14, wherein the application comprises additional instructions that direct the processor to throw the screen view to the television via at least one of a dongle connected to the television, a set top box connected to the television, a game console connected to the television, and an internal component of the television.

20. The touch device of claim 14, further wherein the application comprises additional instructions that direct the processor to present at least one of an available broadcast television channel, a video on demand video, a web available video, or a video game in the primary video display.

* * * * *